(12) United States Patent
Kloss et al.

(10) Patent No.: US 10,596,510 B2
(45) Date of Patent: Mar. 24, 2020

(54) FILTER ELEMENT, IN PARTICULAR FOR GAS FILTRATION

(71) Applicant: MANN+HUMMEL GmbH, Ludwigsburg (DE)

(72) Inventors: Andreas Kloss, Mannheim-Seckenheim (DE); Martin Bottke, Quierschied (DE); Kai Hilarius, Dudenhofen (DE); Oliver Steins, Roemerberg (DE); Stefan Diersch, Trebgast (DE); Dieter Weiss, Gefrees (DE); Christoph Goldbrunner, Dingolfing (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 148 days.

(21) Appl. No.: 15/846,327

(22) Filed: Dec. 19, 2017

(65) Prior Publication Data
US 2018/0169559 A1    Jun. 21, 2018

(30) Foreign Application Priority Data
Dec. 19, 2016  (DE) .................. 10 2016 015 062

(51) Int. Cl.
*B01D 46/10* (2006.01)
*B01D 46/52* (2006.01)
*B01D 46/00* (2006.01)

(52) U.S. Cl.
CPC ....... *B01D 46/522* (2013.01); *B01D 46/0001* (2013.01); *B01D 46/0005* (2013.01); *B01D 46/10* (2013.01); *B01D 2265/04* (2013.01); *B01D 2271/02* (2013.01); *B01D 2271/022* (2013.01); *B01D 2275/205* (2013.01)

(58) Field of Classification Search
CPC .. B01D 46/522; B01D 46/10; B01D 46/0005; B01D 46/0001; B01D 2271/022; B01D 2275/205; B01D 2265/04; B01D 2271/02
USPC ......... 55/385.3, 497, 498, 502, 521, DIG. 5; 210/493.3, 493.5, 493.2, 494.3; 264/339, 264/442, 443, DIG. 48
See application file for complete search history.

(56) References Cited

U.S. PATENT DOCUMENTS 5,501,794 A * 3/1996 Van de Graaf .... B01D 46/0005
                                                        210/493.3
10,155,431 B2 * 12/2018 Luley ................. B01D 46/0002
(Continued)

FOREIGN PATENT DOCUMENTS

| DE | 4138948 A1 | 6/1992 |
| DE | 202007015847 U1 | 1/2008 |
| DE | 102010051197 A1 | 5/2012 |

*Primary Examiner* — Minh Chau T Pham
(74) *Attorney, Agent, or Firm* — James Hasselbeck

(57) ABSTRACT

A filter element is provided with a filter medium body that is a folded filter of filter paper. The filter medium body has an inflow side and an outflow side. A sealing element is arranged on the filter medium body. At an end edge face, the filter medium body has an adhesive bead filling at least partially intermediate fold spaces at end edges of the folds. The filter medium body has a lateral band adhesively connected to and covering the end edge face positioned at an angle relative to the inflow and outflow sides. The lateral band is connected to end edges of the folds at the end edge face and extends all the way to the inflow and outflow sides. The lateral band has at least one leg resting on the inflow side or the outflow side adjacent to a rim area of the filter medium body.

14 Claims, 4 Drawing Sheets

(56) References Cited

U.S. PATENT DOCUMENTS

| | | | | |
|---|---|---|---|---|
| 2006/0005517 A1* | 1/2006 | Sundet | ............... | B01D 46/0001 |
| | | | | 55/497 |
| 2009/0044503 A1* | 2/2009 | Ammersdoerfer | ........................... | |
| | | | | B01D 46/0002 |
| | | | | 55/497 |
| 2014/0331627 A1* | 11/2014 | Majer | .................... | B01D 39/08 |
| | | | | 55/488 |
| 2016/0220940 A1* | 8/2016 | Dressler | ............. | B01D 46/0002 |
| 2017/0291128 A1* | 10/2017 | Luley | ................. | B01D 46/0004 |

* cited by examiner

FILTER ELEMENT, IN PARTICULAR FOR GAS FILTRATION

TECHNICAL FIELD

The invention is in the technical field of gas filtration and separation. The invention relates to a filter element for gas filtration, with a filter medium body that is embodied as a folded filter and on which a circumferentially extending sealing element is arranged.

BACKGROUND OF THE INVENTION

DE 20 2007 015 847 U1 discloses an engine air filter for a motor vehicle with a filter medium body that is embodied as a folded filter. The filter element comprises a rectangular basic cross section and is framed by two oppositely positioned U-shaped frames, wherein the two frames are arranged on the end edges of the folds of the filter medium body. An insert is inserted into the folds of the filter medium body and has the same fold structure as the filter medium body and supports the folds.

SUMMARY OF THE INVENTION

In a filter element for gas filtration, the edges of the filter medium which extend in a zigzag shape due to the folding of the filter medium are generally, and in the meaning of the present invention, referred to as end edges, wherein the zigzag-shape extending end edges each define a lateral face which is referred to as end edge face. The edges of the filter medium which are extending parallel to the fold edges of the filter medium at the respective end of the zigzag-shape folded filter medium body are referred to as terminal edges; the faces which are formed at both ends by the last fold and arranged at an angle to the inflow side or outflow side are referred to as terminal faces. In case of a rectangular folded bellows, there are thus four faces or lateral faces, two oppositely positioned end edge faces and two oppositely positioned terminal faces which are each positioned at an angle, in particular at a right angle, to the inflow side and outflow side that are defined It is the object of the invention to configure a filter element of a constructively simple and stable configuration.

This object is solved according to the invention in that the filter medium body is manufactured of a folded filter paper, in that at least at one face of the filter medium body the intermediate fold spaces at the end edges at least partially are filled with an adhesive bead, and in that at least on one end edge face of the filter medium body, positioned at an angle relative to the inflow side or outflow side, a lateral band covering the end edge face is adhesively connected and is connected with the end edges of the filter medium body and extends all the way to the inflow side and the outflow side of the filter medium body, wherein the lateral band comprises at least one leg that, adjacent to the rim area, is resting on the inflow side or outflow side.

The dependent claims provide expedient further embodiments.

The filter element according to the invention is preferably used for gas filtration, for example, for filtration of the air that is to be supplied to an interior of a vehicle or used as an air filter in the intake manifold of an internal combustion engine.

The filter element comprises a filter medium body which is manufactured of a folded filter paper and at which the filtration is taking place. The filter element with the filter medium body comprises, for example, a rectangular basic cross section wherein the fold edges of the filter medium body embodied as a folded filter form the inflow side and the outflow side. As a result of the configuration of the filter medium body of a folded filter paper, the filter medium body can be produced in an inexpensive and simple way. Further advantages of the use of paper as a filter medium in comparison to other media types such as nonwovens is the high inherent stiffness which already provides a high degree of inherent stiffness of a folded filter medium body and thus contributes to the overall stability of the filter element.

At least at one end edge face of the folded filter, the intermediate fold spaces adjacent to the end edges are filled partially or completely with an adhesive bead. In flow direction of the filter element, the adhesive bead extends between the fold edges positioned at the inflow side and the outflow side and thus across the entire height of the filter medium body so that an improved stability is imparted to the filter element. Since the adhesive beads preferably are extending continuously between the inflow side and the outflow side, they are suitable for transmission of axial forces, here in flow direction, so that, for example, forces for compression of the sealing element, which are required for reaching the seal tightness, can be transmitted at least partially.

On at least one face of the filter medium body which is positioned at an angle relative to the inflow side or the outflow side, in particular on at least one end edge face, a lateral band is adhesively attached that, viewed laterally, covers, preferably completely, the adhesive bead or the end edge face. Preferably, at least on both end edge faces and, further preferred, on all faces of the filter medium body that are positioned at an angle relative to the inflow side or outflow side (each formed by the fold edges), a lateral band according to the invention is arranged. In this context, a section of the lateral band for each face or a partially or completely circumferentially extending lateral band can be provided. The lateral band arranged on the end edge faces is arranged on the end edges of the filter medium body, is connected with them preferably by an adhesive connection, and extends, viewed in flow direction, all the way to the inflow side as well as the outflow side of the filter medium body.

In a preferred embodiment, the lateral band comprises at least one leg and preferably two legs. Preferably, the legs of the lateral band are positioned adjacent to the rim area between the face of the filter medium body and the inflow side or outflow side. Further preferred, one leg is arranged on the side that is positioned opposite the sealing element so that the forces which are required for the axial compression of the sealing element can be introduced into the filter element through the surface area that is made available by the leg. The legs are preferably arranged parallel to the inflow side or outflow side of the filter medium body, i.e., in particular at a right angle to the face of the filter medium body that is angularly positioned relative to the inflow side or outflow side and at which the corresponding lateral band is arranged. In this way, preferably an L-shaped or U-shaped cross section of the lateral band is generated. Preferably, the leg or legs cover in a rim area either partially the inflow side or the outflow side, respectively. They are resting preferably on the fold edges and/or on a support grid positioned on the latter and to be described in the following and, further preferred, are adhesively connected to the fold edges or to the support grid resting thereon, in particular across the entire surface area. Preferably, the legs of the lateral bands which are arranged at the end edge faces are projecting so far past the inflow side and/or outflow side that they project up to the adhesive beads at the end edge faces or, further preferred, project past them. In other words, the adhesive beads are covered by the legs along the end edges or at the end edge faces. Preferably used in combination therewith, the adhesive connection of the legs to the fold edges and/or to a support grid arranged thereon in the area of the adhesive bead thus produces a structure that is continuous in the flow direction, arranged parallel to the respective end edge face, in particular is formed substantially by adhesive, and, in addition to the lateral band reinforced by adhesive, can assist in particular in transmission of axial forces and can improve the torsional stiffness of the filter element. Further preferred, a leg is a carrier of a sealing element which in operation of the filter element separates the outflow or clean side from the inflow or raw side. The face of the filter medium body to which the lateral band is adhesively connected, respectively, is preferably covered completely by the lateral band.

In addition to the adhesive beads, the lateral band improves the stability of the filter medium body and thus of the entire filter element. Due to the significantly improved stability of the filter medium body, even filter elements with a relatively large surface area can be manufactured from folded filter paper that, despite their size, have a relatively high stability. This enables in particular the elimination of other supporting devices, in particular a circumferentially or partially circumferentially extending frame, for example, of plastic material or of metal. It is instead sufficient that the filter element comprises only the filter medium body of the folded filter paper with the adhesive bead on at least one face of the folded filter as well as the glued-on lateral band that covers the adhesive bead.

In the hardened state, the adhesive applied onto the lateral band reinforces the lateral band into whose material the adhesive in the not yet hardened state penetrates partially or completely so that, after hardening, not only the adhesive but also the lateral band provided with it is bending resistant. The lateral band is comprised advantageously of a flexible material, in particular a nonwoven material, which is relatively absorbent and into which the adhesive can penetrate in the not yet hardened state. The lateral band, preferably the adhesive that is applied thereto areally, seals preferably the lateral face covered by the lateral band, in particular at least the respective lateral face of the filter medium body and preferably also the leg or the legs, against fluid passage. The adhesive forms moreover on the lateral faces preferably a seal-tight connection to the end edges or the terminal edges of the filter medium.

The filter element comprises advantageously a parallelepipedal shape. The height of the parallelepiped is defined by the extension of the filter medium body in the flow direction. The face of the folded filter with intermediate fold spaces on the end edges which are filled with the adhesive bead and covered by the lateral band extends preferably at a right angle to the inflow side and outflow side which are extending parallel to each other.

Since a leg of the lateral band is extending across the inflow side or the outflow side and is a carrier of the sealing element, a constructively simple configuration and in particular an easily realizable connection of the sealing element with the filter medium body is achieved. The sealing element is preferably embodied to extend circumferentially and extends across the entire outer rim of the filter medium body at its inflow side or outflow side. Preferably, the sealing element is located at the outflow side of the filter medium body. Even for a possible arrangement of the sealing element on a side where no leg is provided, the seal is preferably arranged at the rim of the inflow side or outflow side, in particular circumferentially, preferably within the inflow side rim or outflow side rim. In this case, the sealing element is also preferably connected seal-tightly with the circumferentially arranged lateral band, for example, by a seal-tight contact, by an adhesive connection, or by foaming on the sealing material.

The sealing element is in particular adhesively connected to the leg of the lateral band. For this purpose, a hot melt adhesive can be applied onto the exterior side of the leg of the lateral band onto which the sealing element is placed. However, it is also possible to apply a hot melt adhesive onto the complete inner side of the lateral band including the leg. This can be done also such that the hot melt adhesive penetrates through the material of the lateral band so that, in the area of the leg, the adhesive also reaches the exterior side of the leg and produces the adhesive connection with the sealing element.

As material for the adhesive which is present in particular as hot melt adhesive (so-called hot melt), a polyamide-based or polyester-based hot melt adhesive is conceivable, for example. The adhesive which is preferably applied to the inner side of the lateral band penetrates in addition into the material of the filter medium body and provides a fixed adhesive connection between the lateral band and the filter medium body.

The lateral band comprises advantageously only a minimal thickness which, as needed, is within the same magnitude as the thickness of the filter paper from which the filter medium body is formed, or comprises, for example, two times, three times, four times, or five times the thickness of the filter paper.

As a material for the sealing material, for example, a foam material is conceivable, for example, a cellular rubber or another sealing profile that in particular is present in continuous form, wherein the sealing element as a pre-manufactured component is connected to the filter medium body, in particular is adhesively connected. It is also possible that the sealing material is comprised of PUR material that, as needed, is applied immediately onto the filter medium body, for example, foamed on or adhesively connected.

According to an advantageous embodiment, the lateral band is placed in an L-shape or preferably U-shape about the face of the filter medium body wherein one leg or both legs of the lateral band that are projecting angularly are resting on the inflow side and/or the outflow side of the filter medium body and are resting in this area on the fold edges of the filter medium body and/or on a support grid placed thereon.

Advantageously, on both diametrically opposed end edge faces of the folded filter lateral bands are provided, respectively, and cover the end edges of the filter medium body and are in particular seal-tightly adhesively connected with the end edges so that the inflow side is separated from the outflow side. Each lateral band is embodied either L-shaped with only one leg which is located either at the inflow side or the outflow side or is U-shaped with two legs of which one is located at the inflow side and at the outflow side, respectively.

At the terminal faces of the filter medium body, an L-shaped or U-shaped lateral band can be adhesively connected also. According to a further expedient embodiment, preferably both terminal faces of the filter medium body are glued with an adhesive that is applied immediately onto the outwardly positioned fold, i.e., the terminal fold, of the filter paper. In the hardened state, seal tightness at the externally positioned fold is achieved by means of the applied adhesive.

As material for the filter paper of the filter medium body, cellulose or a cellulose mixed fiber with a cellulose proportion of preferably at least 70% is conceivable. The fold height is preferably within a range of magnitude between 15 mm and 75 mm, for example, is 48 mm. The fold spacing is advantageously in a range of magnitude of 2.5 mm to 6.0 mm, for example, is 3 mm. The material thickness is advantageously within a range of magnitude between 0.3 mm and 0.6 mm, for example, is 0.48 mm. The weight per surface area is advantageously in a range of magnitude between 90 g/m$^2$ and 150 g/m$^2$, for example, is 116 g/m$^2$ plus/minus 5 g/m$^2$. Filter papers that are selected accordingly provide in general good filtration properties and a strength which enables the formation of a stable filter element with improved torsional stiffness.

According to a further advantageous embodiment, the intermediate fold spaces adjacent to the end edges of the filter medium body are provided only on one side, for example, only at the inflow side or only at the outflow side, with the adhesive bead, in particular filled completely. This is in principle sufficient for increasing relative to the flow direction the strength and the stiffness of the filter medium body in the rim area across the entire axial height. In an alternative embodiment, the intermediate fold spaces at the inflow side as well as at the outflow side are provided with the adhesive bead, in particular filled completely.

It is in particular expedient that adhesive beads are introduced into the intermediate fold spaces adjacent to the respective end edges at both diametrically opposed sides. The adhesive beads are covered respectively by a lateral band that is adhesively connected to the filter medium body.

According to a further expedient embodiment, the adhesive bead introduced into the intermediate fold spaces is embodied independent of the adhesive which is located at the inner side of the lateral band. Accordingly, the adhesive of the adhesive bead and the adhesive on the inner side of the lateral band are applied or introduced in different method steps. With the lateral band attached, the adhesive which is located at the inner side of the lateral band can remain spaced apart from the adhesive of the adhesive bead or can be in contact therewith in particular in a sealing manner, i.e., continuously. As needed, the adhesive which is located at the inner side of the lateral band and the adhesive of the adhesive bead are the same adhesive material, even though also embodiments with different adhesive materials are possible. When using an adhesive layer which is completely areally applied onto the lateral band at the respective end edge face, it is also possible that an adhesive bead that is designed continuously or configured for seal-tightness is not needed at this face, respectively, i.e., either only a partially extending adhesive bead or no adhesive bead is provided. This is enabled in that the separation between inflow side and outflow side is provided by the adhesive on the lateral band.

According to a further expedient embodiment, either at the inflow side or at the outflow side, i.e., at the side which is neighboring the sealing element or which is opposite the sealing element, optionally on both sides, a support grid can be arranged. The support grid is comprised preferably of a plastic material and has, for example, a thickness of 1 mm to 10 mm. As needed, also an embodiment of the support grid of metal is conceivable, for example, as expanded metal or perforated sheet metal, with a thickness of 0.5 mm to 1 mm. The support grid is located preferably at the side of the filter medium body which is opposite the sealing element. Accordingly, the support grid is arranged at the inflow side, provided the sealing element is arranged at the outflow side.

According to a further expedient embodiment, the support grid is adhesively connected to a leg of the lateral band that is located at the inflow side or outflow side. In this embodiment, the lateral band is embodied as a U-shaped profile and comprises two legs of which one each is positioned at the inflow side and at the outflow side and is carrier of the sealing element or of the support grid According to yet another advantageous embodiment, the lateral band has a cut at the transition to the leg which is resting neighboring the rim area on the inflow side or outflow side. The cut facilitates folding of the leg along the inflow side or outflow side.

The invention concerns furthermore a filter device which is provided with the previously described filter element and also comprises a filter housing for receiving the filter element.

In a method for producing a filter element as described above, first the filter medium body is produced from the filter paper. For this purpose, the filter medium body is pleated and the folds are individualized; subsequently, on at least one face the intermediate fold spaces are partially or completely filled with an adhesive bead. In a further step, as needed, a support grid can be arranged at the inflow side and/or at the outflow side of the filter medium body and, as needed, immediately connected to the filter medium body, in particular by an adhesive connection. In a further step, a lateral band coated with adhesive is applied to the end edges of the intermediate fold spaces filled with the adhesive bead and adhesively connected to the end edges of the filter medium body. At least one leg, as needed, two legs, are folded over and are resting against the inflow side and/or outflow side, whereupon the sealing element is placed or foamed in particular onto a folded leg of the lateral band. Upon placement, the connection to the leg of the lateral band is preferably realized by an adhesive connection. Adjacent to that face of the filter medium body where no lateral band is positioned, the connection of the pre-manufactured sealing element with the filter medium body takes place also by adhesive connection. However, it is also possible to adhesively connect a lateral band to all faces of the filter medium body.

The filter material of the filter medium body is preferably a filter paper that is laid into folds. As an alternative to a filter paper, as a filter material for the filter medium body also a different folded filter material can be employed, for example, a nonwoven material that is also folded.

BRIEF DESCRIPTION OF THE DRAWINGS

Further advantages and expedient embodiments can be taken from the additional claims, the figure description, and the drawings:

In the Figures, same components are identified with same reference characters.

DETAILED DESCRIPTION

Figure 1:
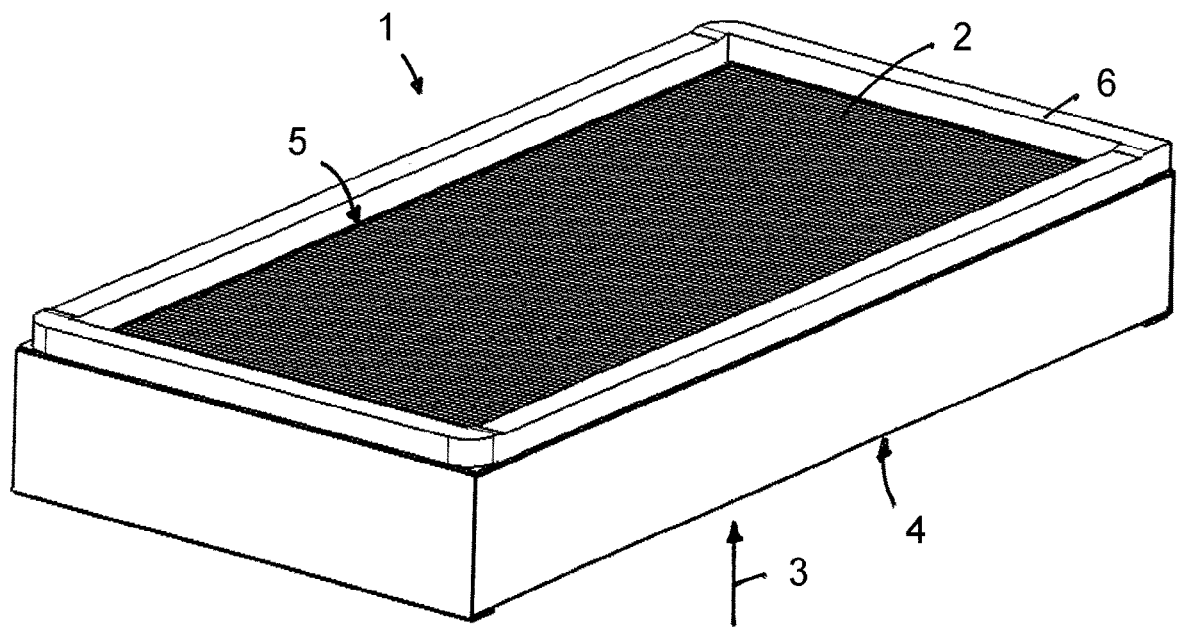
FIG. 1 shows a perspective illustration of a parallelepipedal filter element in a view from above.
Figure 2:
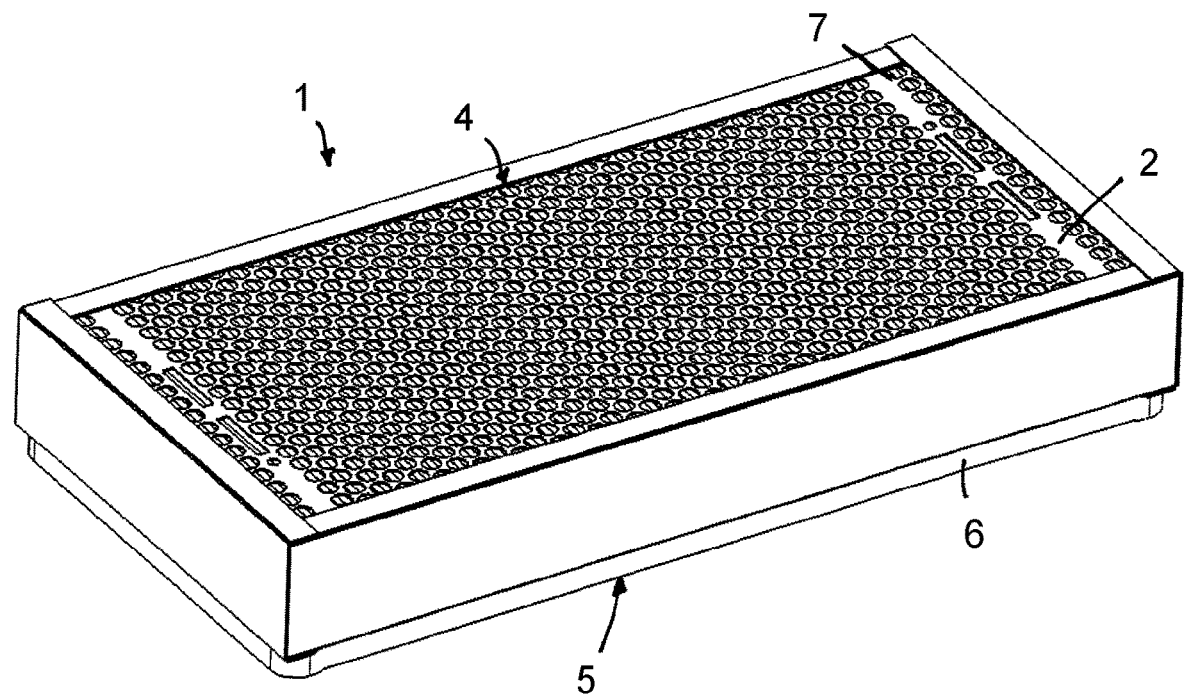
FIG. 2 shows the filter element in a view from below.

In FIGS. 1 and 2, a filter element 1 is illustrated that, for example, can be used for purifying air to be supplied to an interior of a vehicle. The filter element 1 is of a parallelepipedal shape and comprises a filter medium body 2 which is embodied as a folded filter and which, as shown in FIG. 1 by the arrow 3, is flowed through by the fluid to be purified, wherein the parallel large surface area sides form the inflow or raw side 4 and the outflow or clean side 5. The height of the filter medium body 2 is determined by the spacing between the inflow side 4 and the outflow side 5.

At the outflow side 5 of the filter element 1, there is a circumferentially extending sealing element 6 which is arranged in the rim area of the filter medium body 2 and in flow direction projects past the outflow side 5 of the filter medium body 2. The sealing element 6 is connected fixedly to the filter medium body 2, in particular adhesively connected.

At the inflow side 4, there is a support grid 7 that, for example, is embodied as a plastic component and comprises a plurality of flow openings through which the medium to be purified can pass through to the inflow side 4 of the filter medium body 2. The support grid 7 is also connected fixedly to the filter medium body 2.

Figure 3:
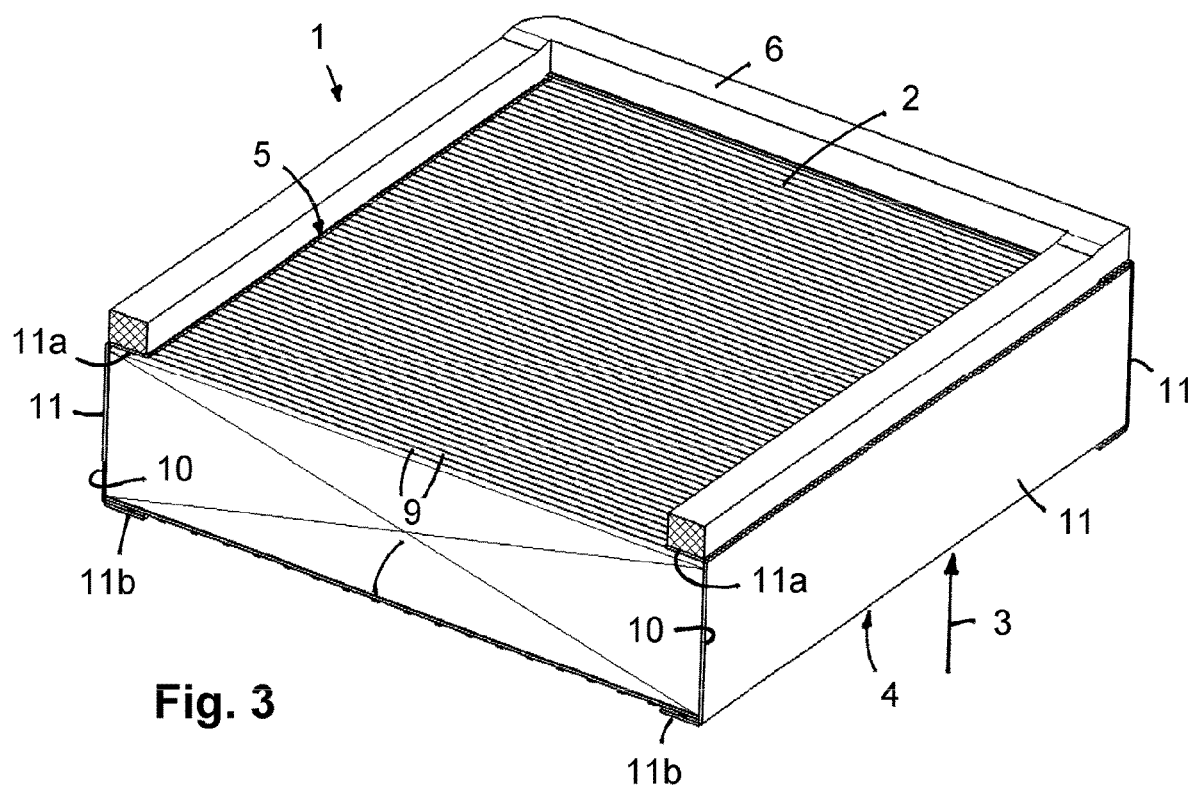
FIG. 3 shows the filter element in an illustration corresponding to FIG. 1 in section view.

As can be taken from the section illustration according to FIG. 3, the filter medium body 2 where the filtration of the fluid takes place is manufactured of a folded filter paper whose fold edges 9 are positioned at the inflow side 4 and the outflow side 5, wherein a plurality of fold edges 9 extend parallel to each other at the inflow side as well as at the outflow side. At a right angle to the fold edges 9, the end edges 10 of the individual folds are located at oppositely positioned lateral areas of the filter medium body 2.

Figure 4:
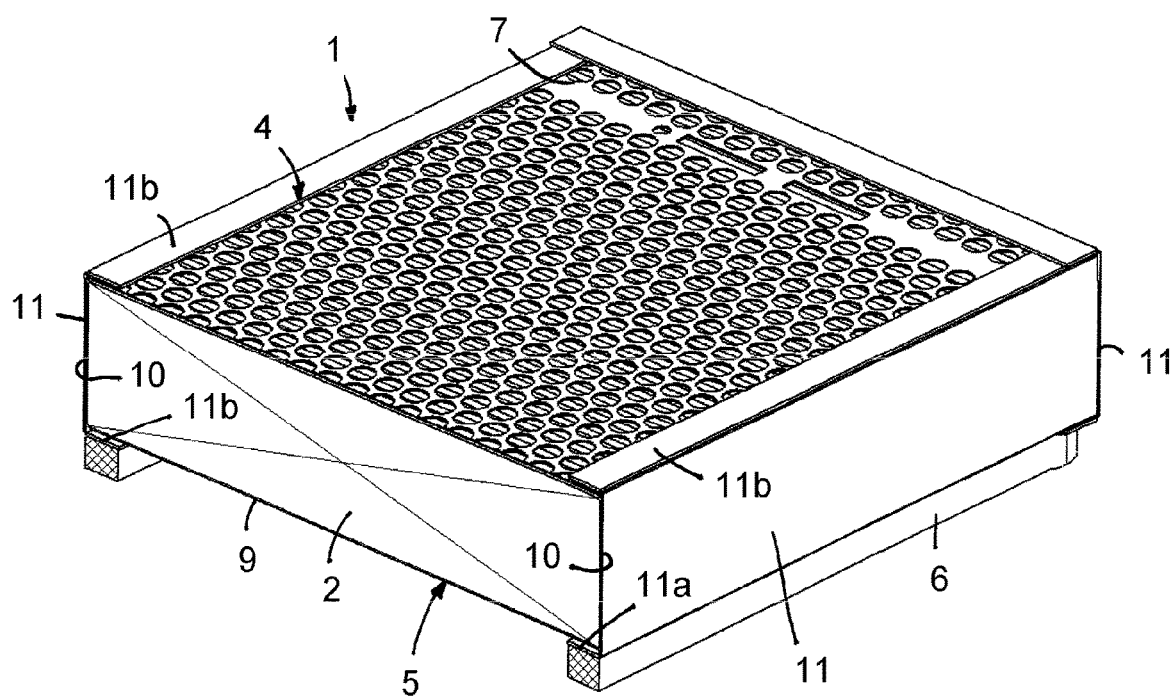
FIG. 4 is an illustration of the filter element corresponding to FIG. 2 in section view.
Figure 5:
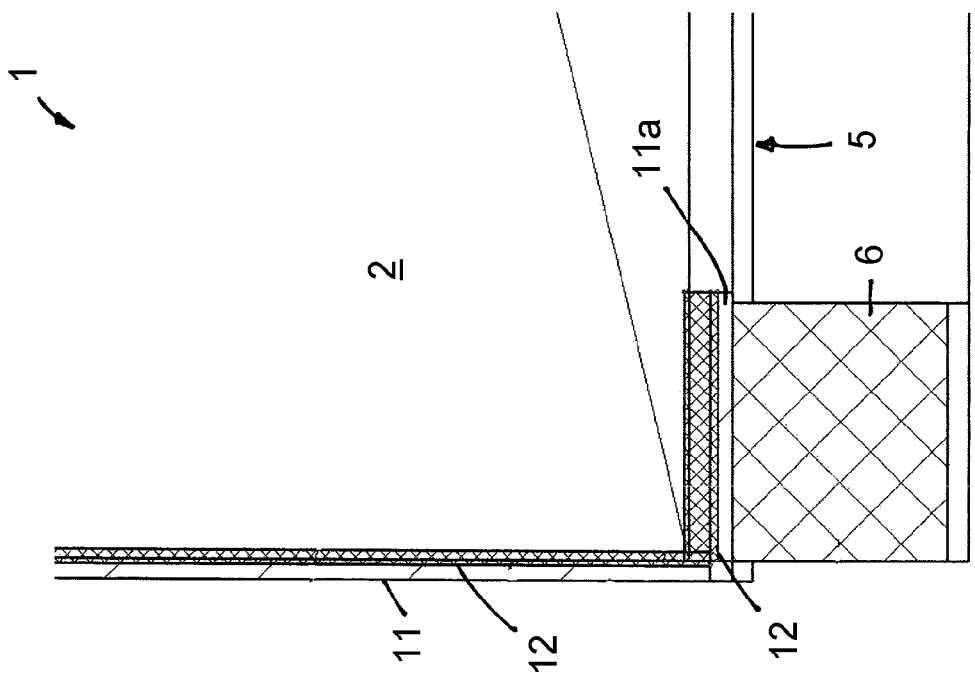
FIG. 5 shows the lateral area of the filter element in section view.

As can be taken from FIG. 5 in connection with FIGS. 3 and 4, the two oppositely positioned faces of the filter medium body 2 where the end edges 10 of the folds are located are covered by a lateral band 11. On the inner side of the lateral band 11, an adhesive layer 12 is located, for example, a hot melt adhesive, that is applied to the inner side of the lateral band 11 and with which the adhesive connection of the lateral band 11 to the end edges 10 of the filter medium body 2 is realized. The lateral band 11 is comprised preferably of a nonwoven material. The adhesive layer 12 realized as a hot melt adhesive propagates in the not yet hardened state into the material of the lateral band 11 and penetrates also into the end edges 10 of the filter medium body 2. After hardening of the adhesive, a fixed connection between the lateral band 11 and the filter medium body 2 is provided, on the one hand. On the other hand, also flow seal tightness of the lateral band 11 is achieved due to the large surface area application of the adhesive layer 12 on the lateral band 11. Moreover, the lateral band 11 stiffens after hardening of the adhesive layer 12 so that a significant improvement of the stability of the filter medium body 2 is achieved.

The lateral bands 11 on diametrically opposed faces of the filter medium body 2 are of the same configuration.

Each lateral band 11 comprises two rim-side legs 11*a*, 11*b* which project past the rim of the inflow side 4 and the outflow side 5 and are folded by 90° and are resting on the inflow side 4 or outflow side 5, respectively. In the area of the inflow side 4, the legs 11*b* are resting on the support grid 7 which is located directly on the inflow side 4 of the filter medium body 2. Due to the adhesive layer 12 which is extending along the legs 11*a* and 11*b*, the leg 11*a* is immediately adhesively connected to the filter medium body 2 and the additional leg 11*b* is adhesively connected to the support grid 7.

The leg 11*a* of the lateral band 11 is a carrier of the sealing element 6. The sealing element 6 is embodied, for example, as a cellular rubber seal and is adhesively connected to the leg 11*a*. For this purpose, a separate adhesive layer can be applied to the exterior side of the leg 11*a* or to the facing side of the sealing element 6. As needed, it may also be sufficient that the adhesive layer 12 on the inner side of the lateral band 11 completely penetrates the material of the lateral band and reaches the exterior side of the lateral band so that the adhesive is present also in the area of the leg 11*a* on the exterior side by means of which then the seal 6 can be adhesively connected.

The lateral bands 11 are located at least at the diametrically opposed faces with the end edges 10 on the filter medium body 2. Moreover, it is also possible, as indicated in FIGS. 3 and 4, that the two additional faces which are positioned at a right angle relative to the end edge faces are covered by a lateral band 11, respectively, wherein these lateral bands 11 are embodied so as to correspond to the lateral bands 11 on the end edges. In this way, a total of four lateral bands 11 are arranged on the filter medium body 2 and cover all faces of the filter medium body 2 circumferentially in a flow-tight way. Also, in this embodiment, a circumferentially extending carrier layer is provided by means of the folded legs 11*a* for carrying and connecting the sealing element 6.

Figure 6:
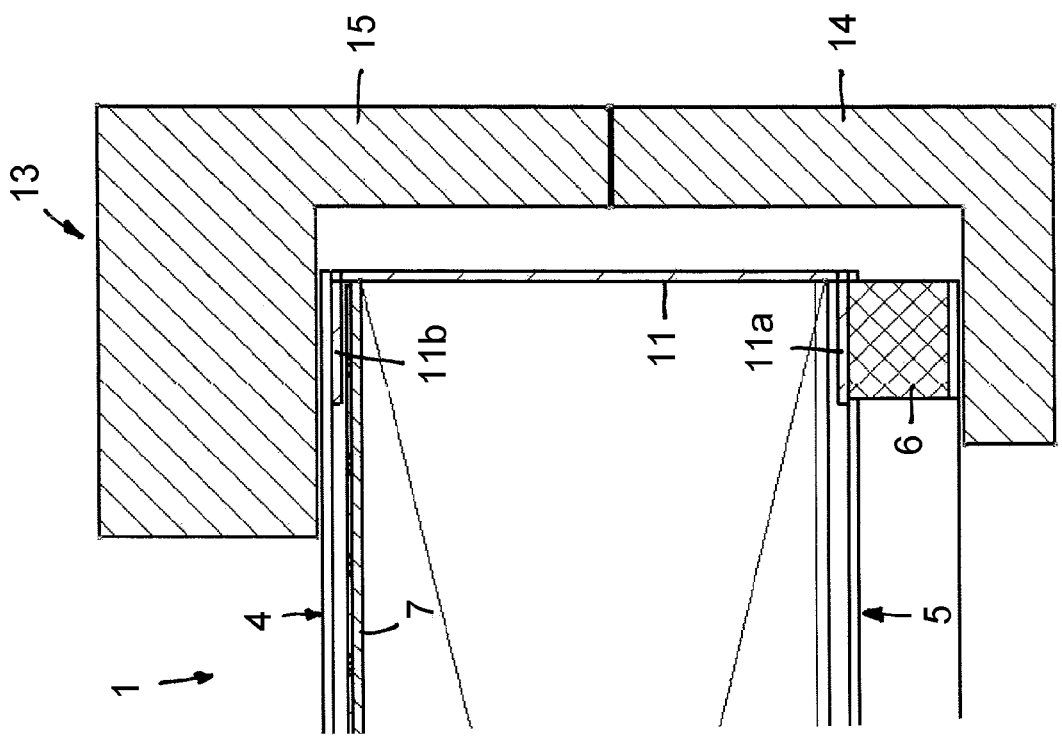
FIG. 6 shows a filter device with a receiving filter housing and an inserted filter element in section view.

In FIG. 6, a filter device 13 is shown in section view that comprises a filter housing with a filter housing base 14 and a housing cover 15; the filter element 1 is inserted into the filter housing. The inflow and the outflow of the fluid are realized as described at the filter element 1 by means of inflow side 4 and outflow side 5.

Figure 7:
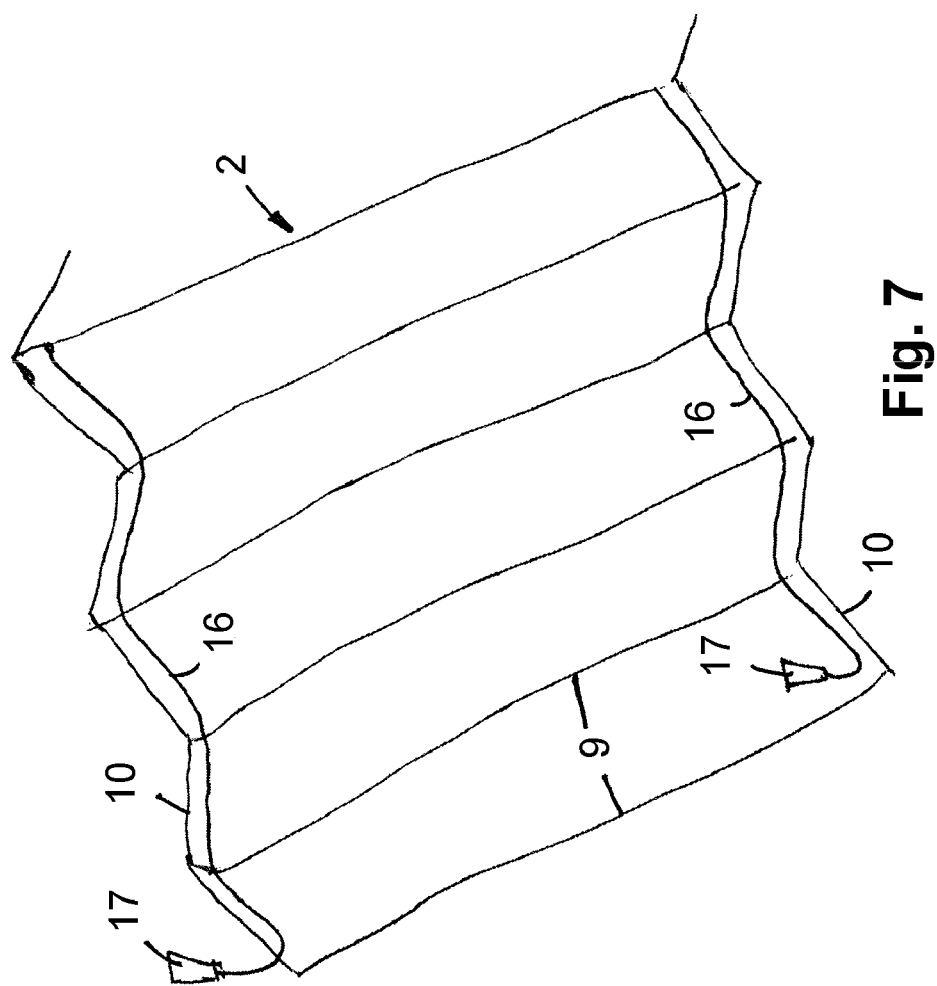
FIG. 7 is a folded filter paper from which the filter medium body is created, with application of two adhesive beads.

FIG. 7 shows schematically a filter paper from which the filter medium body 2 is produced by folding. The filter paper is provided with fold edges 9 which indicate already the folded basic structure of the filter medium body. In the area of the oppositely positioned end edges 10, the application of an adhesive bead 16 by means of an application device 17 is realized, respectively. The application is realized at the two oppositely positioned end edges 10 preferably on the same side of the filter medium body which in the finally folded state is either the inflow side or the outflow side. However, it is also possible to apply at both oppositely positioned sides, i.e., at the inflow side as well as at the outflow side, an adhesive bead 16, respectively.

Figure 8:
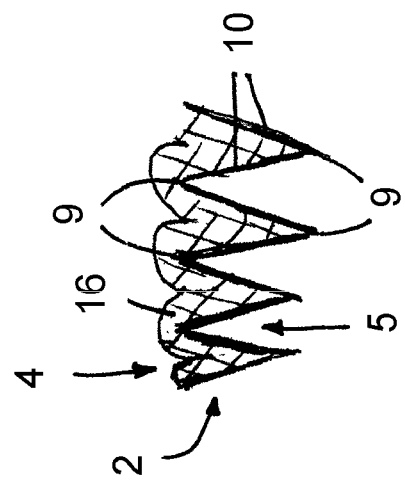
FIG. 8 shows the end edges of the folded filter medium body with introduced adhesive bead in section view.

In FIG. 8, the filter medium body is illustrated in a detail view in section in folded state and with adhesive bead 16. The adhesive bead 16 fills completely the intermediate space in the folds adjacent to the end edges 10 and is arranged so as to face the inflow side 4 in the embodiment. As shown in FIG. 8, the adhesive bead 16 bridges across the intermediate space formed by the valley between adjacent folds to adhesively connect adjacent folds. The adhesive bead 16 extends across the entire height of the filter medium body 2 and imparts to it an increased stability in the rim area.

In the finish-mounted state, the adhesive beads 16 are covered by the lateral band 11. In this context, the adhesive bead 16 which is arranged adjacent to the end edges 10 can come into contact with adhesive on the inner side of the lateral band. By means of the combination of the adhesive bead 16 with the lateral band 11 provided with adhesive, a significant improvement of the stability of the filter medium body is achieved.

While specific embodiments of the invention have been shown and described in detail to illustrate the inventive principles, it will be understood that the invention may be embodied otherwise without departing from such principles.

What is claimed is:

1. A filter element comprising:
    a filter medium body embodied as a folded filter medium of a folded filter paper and comprising folds with intermediate fold spaces formed as valley between adjacent folds;
    the filter medium body comprising an inflow side and an outflow side;
    wherein each fold has an inflow face and an opposing outflow face extending from a first end edge face of the filter medium body to an opposite second end edge face of the filter medium body;
    a sealing element arranged on the filter medium body;
    an adhesive bead applied onto the inflow face or the outflow face of the folds inwardly from the end edge faces of the folded filter medium, the adhesive bead bridging across the intermediate fold spaces in the valley between adjacent folds of folded filter medium to directly adhesively connect the adjacent folds of filter medium to each other across the valley;
    the filter medium body comprising a first lateral band of a nonwoven material adhesively connected to and covering the first end edge face of the filter medium body, the first lateral band extending on and covering the end edge face of the folds from the inflow side to the outflow side of the filter medium body, the first lateral band having a leg formed as a right angle fold at the inflow side and/or at the outflow side of the filter medium body, the leg projecting inwardly from the end edge face inwardly to rest on and cover a portion of the folds on the inflow side and/or the outflow side of the folded filter medium body;
    wherein the first lateral band extends all the way from the inflow side to the outflow side.

2. The filter element according to claim 1, wherein the at least one leg of the first lateral band is a carrier of the sealing element.

3. The filter element according to claim 1, wherein the adhesive bead is covered or overlapped by the at least one leg of the first lateral band.

4. The filter element according to claim 1, wherein the first lateral band includes
    a second leg,
        wherein the first leg is resting on the inflow side and the second leg is resting on the outflow.

5. The filter element according to claim 1, wherein the filter medium body comprises
    a second lateral band that covers end edges of the folds at the second end edge face,
        wherein the first and second lateral bands are adhesively connected to the end edges of the folds, respectively.

6. The filter element according to claim 1, wherein the first lateral band comprises
    an inner side facing the filter paper of the filter medium body and coated with a hot melt adhesive.

7. The filter element according to claim 6, wherein the adhesive bead is embodied independent of the hot melt adhesive on the inner side of the first lateral band.

8. The filter element according to claim 1, wherein the intermediate fold spaces are filled with the adhesive bead only adjacent to the inflow side or only adjacent to the outflow side.

9. The filter element according to claim 1, further comprising
    at least one support grid arranged at the inflow side; at the outflow side; or at the inflow side and at the inflow side.

10. The filter element according to claim 9, wherein the at least one support grid is adhesively connected to at least one of the legs of the first lateral band.

11. The filter element according to claim 1, wherein the first lateral band comprises
    a cut at a transition to the at least one leg resting adjacent to the rim area on the inflow side or the outflow side.

12. A filter device comprising
    a filter element according to claim 1 and
    a filter housing configured to receive the filter element.

13. A method for producing a filter element comprising
    a filter medium body embodied as a folded filter medium of a folded filter paper and comprising folds with intermediate fold spaces formed as valley between adjacent folds,
    wherein the filter medium body comprises an inflow side and an outflow side,
    wherein each fold has an inflow face and an opposing outflow face extending from a first end edge face of the filter medium body to an opposite second end edge face of the filter medium body,
    wherein a sealing element is arranged on the filter medium body,
    wherein the filter medium body comprises
        at least at a first end edge face of the filter medium body an adhesive bead filling at least partially the intermediate fold spaces at end edges of the folds,
    wherein the filter medium body comprises a first lateral band of a nonwoven material adhesively connected to and covering the first end edge face of the filter medium body, the first lateral band extending on and covering the end edge face of the folds from the inflow side to the outflow side of the filter medium body, the first lateral band having a leg formed as a right angle fold at the inflow side and/or at the outflow side of the filter medium body, the leg projecting inwardly from the end edge face inwardly to rest on and cover a portion of the folds on the inflow side and/or the outflow side of the folded filter medium body;
    wherein the first lateral band is connected to end edges of the folds at the first end edge face, and
    wherein the first lateral band extends all the way to the inflow side and the outflow side,
    wherein the first lateral band comprises at least one leg resting on the inflow side or the outflow side adjacent to a rim area of the filter medium body; the method comprising the steps of:
        providing a filter medium;
        providing an adhesive;
        providing a first lateral band coated with an adhesive;
        applying an adhesive bead onto the inflow face or the outflow face of the filter medium, inwardly from the end edge faces;
        folding the filter medium, forming a filter medium body of folded filter medium having folds with intermediate fold spaces formed as valley between adjacent folds, wherein in the folding step, the adhesive bead bridges across the intermediate fold spaces in the valley between adjacent folds, adhesively connecting adjacent folds of filter medium to each other across the valley, the adhesive bead at least partially filling the intermediate fold spaces;

subsequently, applying the first lateral band coated with an adhesive onto said end edges of the folds at the first end edge face and adhesively connecting the first lateral band to said end edges of the folds;

forming a right angle fold in the first lateral band at the inflow side and/or at the outflow side of the folded filter medium, the right angle fold forming a leg projecting inwardly from the end edge face and resting on, adhesively fixed to and covering over a portion of the folds on the inflow side and/or the outflow side of the folded filter medium body; and arranging the sealing element on the filter medium body.

14. The method according to claim 13, wherein in the step of arranging the sealing element, the sealing element is arranged to rest on the leg of the first lateral band.

\* \* \* \* \*